United States Patent
Willems et al.

(10) Patent No.: US 9,273,826 B2
(45) Date of Patent: Mar. 1, 2016

(54) SINGLE POINT LUBRICATOR

(75) Inventors: Guus Willems, Utrecht (NL); Harry Warmer, Wilnis (NL)

(73) Assignee: AKTIEBOLAGET SKF, Gothenburg (SE)

( * ) Notice: Subject to any disclaimer, the term of this patent is extended or adjusted under 35 U.S.C. 154(b) by 457 days.

(21) Appl. No.: 13/698,877

(22) PCT Filed: May 21, 2010

(86) PCT No.: PCT/EP2010/003129
§ 371 (c)(1),
(2), (4) Date: Dec. 7, 2012

(87) PCT Pub. No.: WO2011/144227
PCT Pub. Date: Nov. 24, 2011

(65) Prior Publication Data
US 2014/0144727 A1 May 29, 2014

(51) Int. Cl.
F16N 11/10 (2006.01)
(52) U.S. Cl.
CPC ...................................... F16N 11/10 (2013.01)
(58) Field of Classification Search
CPC ................................. F16N 11/10; F16N 11/08
USPC .............. 184/29, 39, 55.1; 220/254.8, 254.1, 220/254.9, 281; 215/330
See application file for complete search history.

(56) References Cited

U.S. PATENT DOCUMENTS

| | | | | |
|---|---|---|---|---|
| 4,023,648 A * | 5/1977 | Orlitzky et al. | ................. | 184/39 |
| 4,671,386 A * | 6/1987 | Orlitzky | ......................... | 184/39 |
| 4,744,442 A * | 5/1988 | Bras et al. | ........................ | 184/39 |
| 5,012,897 A * | 5/1991 | Jorissen | .......................... | 184/39 |
| 5,242,565 A | 9/1993 | Winsel | | |
| 5,386,883 A * | 2/1995 | Graf | ................................ | 184/39 |
| 5,404,966 A * | 4/1995 | Yang | ............................... | 184/39 |
| 5,460,242 A * | 10/1995 | Graf | ................................ | 184/29 |
| 5,598,901 A * | 2/1997 | Graf | ................................ | 184/39 |
| 5,634,566 A * | 6/1997 | Jansen et al. | ............... | 220/254.8 |
| 7,398,891 B2 * | 7/2008 | Yang | ......................... | 220/212.5 |
| 8,905,194 B2 * | 12/2014 | Morper et al. | .................. | 184/39 |
| 2006/0180395 A1* | 8/2006 | Graf | ................................ | 184/26 |
| 2008/0060879 A1* | 3/2008 | Orlitzky et al. | ................. | 184/39 |
| 2008/0271951 A1* | 11/2008 | Eisenbacher et al. | .......... | 184/39 |
| 2009/0038888 A1* | 2/2009 | Eisenbacher | ................... | 184/39 |
| 2011/0315485 A1* | 12/2011 | Morper et al. | .................. | 184/39 |

FOREIGN PATENT DOCUMENTS

DE 102004013594 A1 10/2005
EP 0644369 A1 3/1995

* cited by examiner

Primary Examiner — William E Dondero
Assistant Examiner — Mark K Buse
(74) Attorney, Agent, or Firm — Bryan Peckjian; SKF USA Inc. Patent Dept.

(57) ABSTRACT

The present invention relates to a lubrication device for gas pressure-driven lubrication of a lubrication point. The device comprises a lubricant container provided at a first end with an outlet opening and is covered at a second end by a combination of a collar and an insert received within the collar and wherein the collar and the insert are relatively rotatable. The device further comprises gas generation means housed within one of the collar or the insert. The insert is provided with a groove having a contact surface forming a mechanical interlock with one or more catches of the collar, and the device comprises a release position of the insert relative to the collar, in which a force required to disengage the mechanical interlock is lower than at non-release positions, so that the insert can be removed to gain access to the gas generation means for separate disposal thereof.

17 Claims, 4 Drawing Sheets

SINGLE POINT LUBRICATOR

CROSS-REFERENCE

This application is the U.S. national stage of International Application No. PCT/EP2010/003129 filed on May 21, 2010.

TECHNICAL FIELD

The present invention relates to a device for gas pressure-driven lubrication of a lubrication point.

BACKGROUND OF THE INVENTION

In industry, there is a constant need to lubricate moving systems, such as moving axles, rotating bearings and other machine elements having surfaces that bear and glide on each other. In some cases, lubrication-free components may be used: This is however only possible for lower loads and slow moving speeds. For other systems, where high loads are imposed on the bearing surfaces and/or where the speed, either rotational or linear, is relatively high, there exists a need to lubricate the surfaces. The periodicity of the application of lubricant and the amount of lubrication applied may vary extensively. In some cases, a small amount of lubricant may be required every day and in other cases, lubrication may be performed every three months.

Especially when the lubrication must be performed at short intervals, and also where the lubrication point is hard to reach, an automatic lubrication device is advantageous. There are known lubrication devices that comprise a pump of some kind, a lubricant reservoir such as a grease container and a control unit that dispenses a predefined amount of lubricant to the lubrication point at predetermined time intervals. Such a system is rather complicated and the size is often rather large.

Another type of automatic lubrication device is a self-contained grease container which somewhat resembles a grease cartridge. Such a grease container comprises a gas generating cell and a compartment of grease which dispenses grease from the compartment to the lubrication point. The gas generation may be based on a dry cell that produces gas in an electrochemical way. The amount of generated gas is controlled by the current flowing from a gas generating electrode to a counter electrode. The generated gas will build up a pressure inside the container which in turn causes a piston to dispense grease from a lubricant opening.

Such a lubrication device is known from U.S. Pat. No. 5,012,897. In this lubrication device, two gas cells are connected to each other through a fixed resistor by an intermediate spring. By screwing the top part of the device into the container lid, the spring connects the two cells such that the electric circuit closes and gas starts to generate. The top part may be unscrewed somewhat in order to disconnect the electrical circuit, and by unscrewing the top part completely, new gas cells may be fitted.

One disadvantage of being able to replace the gas cell in an easy way is that the manufacturer of the lubrication device cannot guarantee a proper function of the lubrication device since it is possible to tamper with the gas cell. By replacing the gas cell, there is a possibility for the user to insert a used gas cell with a reduced capacity, which would lead to a reduced life of the lubrication device compared with what was expected. It is also possible to insert a different type of gas cell or to position the gas cell in a wrong way, which would also lead to a malfunction of the lubrication device. In those cases, the lubrication of the machine part may fail with a breakdown as result. Further, it is possible to damage parts of the gas generating device which will also lead to the lubrication device not functioning properly.

DE 10 2004 013 594 describes a lubrication device in which the lid may be used to set the amount of dispensed lubricant. The lid of the container is provided with a rotatable part comprising a potentiometer element. The rotatable part is provided with protrusions that stop the rotatable part from being removed once it is in position. The lid is fixedly attached to the container. In this way, the container may not be refilled and the gas cell may not be removed or replaced.

In this lubrication device, the user has no possibility to tamper with the gas cell. There is however no possibility to dispose of the gas cell in a proper manner. The gas cell, and in this case also the battery cell, should be removed before the rest of the lubrication device is disposed of. This makes it difficult to recycle the parts of the lubrication device. There is thus room for improvements.

SUMMARY OF THE INVENTION

An object of the invention is therefore to provide a lubrication device that is tamper-proof and that can be taken apart for recycling and separate disposal of component parts in a straightforward manner. A further object of the invention is to provide a lubrication device with a reduced number of parts.

The solution to the problem according to the invention is described in the characterizing part of claim 1. The other claims contain advantageous embodiments and further developments of the lubrication device.

In a lubrication device for gas pressure-driven lubrication of a lubrication point, the device comprising a lubricant container which has an outlet opening at a first end and is covered at a second end by a combination of a collar and an insert received within the collar in a mechanically interlocking fashion, and further comprising a gas generation means housed within the combination, the object of the invention is achieved in that the lubrication device is provided with a release position of the insert relative to the collar, in which a force required to remove the insert from the collar is lower than at non-release positions.

The gas generation means is housed in one of the insert or the collar, and the mechanical interlock between these two components is therefore able to withstand at least the working pressure of the device. In the non-release positions, a removal force required to disengage the mechanical interlock may be at least five times greater than a maximum working force exerted on the mechanical interlock at a maximum working pressure of the device. To facilitate removal of the insert, to gain access to the gas generation means for separate disposal thereof, the removal force required when the device is in the release position may be less than four times the maximum working force. For safety reasons, the removal force in the release position is preferably at least two times greater than the maximum working force. Other values are possible, depending on the maximum working pressure, and the mechanical interlock between the insert and the collar is suitably designed such that the device can safely withstand excess pressures yet is relatively easy to take apart in the release position.

According to the invention, the mechanical interlock is formed in that the collar comprises one or more catches and the insert comprises a groove with a contact surface which cooperates with the one or more catches. Suitably, the contact surface of the groove comprises a notch which, in the release position, is at least partially aligned with a catch of the collar. The mechanical interlock between the insert and the collar is therefore lower in the release position than at non-release positions of the insert relative to the collar, meaning that less force is required to remove the insert.

In one embodiment, the collar comprises a cylindrical portion for receiving a corresponding portion of the insert, whereby the one or more catches are formed by protrusions on an inner surface of the cylindrical portion. The groove is provided on an outer surface of the corresponding portion of the insert, whereby the notch is provided in the contact surface of the groove. In some examples of a device according to the invention, the notch has the same width as a specific release catch that is narrower than other catches of the collar. In the release position, the narrow catch is aligned with the notch. Alternatively, the collar may comprise a single catch that is substantially wider than the notch, whereby a release edge of the catch is in alignment with the notch in the release position. In other examples, the collar comprises two or more catches that are slightly wider than the notch, whereby in the release position, the notch is aligned with a release edge of one of the catches.

To further facilitate the removal of the insert from the collar, the collar suitably comprises a cut-out for receiving a pry tool. In a preferred embodiment, the release position is reached by aligning an indicator on the insert with the cut-out. The cut-out may extend below a ledge of the collar on which a rim of the insert rests, so that the pry tool may be inserted underneath the rim of the insert in order to prize off the insert. In an alternative embodiment, the cut-out does not extend below the ledge and the rim of the insert comprises an inwardly extending recess for receiving e.g. the blade of a screwdriver, such that the insert can only be prized off when the recess is aligned with the cut-out.

In some examples of a lubrication device according to the invention, the gas generation means is housed within the insert. In other examples, the gas generation means is housed in the cylindrical portion of the collar that receives the insert, such that the insert serves as a cap. Further, the device may be executed with the collar being rotatable relative to the insert, but is preferably executed with the insert being rotatable relative to the collar. This latter execution is advantageous in that one end of the lubricant container can be covered by only two parts, one of which holds the gas generation means. As a result, the device need be provided with only one seal between the collar and the insert, thereby minimising the number of component parts of the device.

Any electrochemical gas generation means which are suitable for a gas pressure-driven lubricator may be used in a device according to the invention; for example, an electrolytic cell and separate battery. In a preferred embodiment, the gas generation means is a dry cell such as disclosed in U.S. Pat. No. 5,242,565, an example of which is shown in FIG. 4. The advantage of a dry cell is that a separate battery is not required, which again allows the number of component parts to be minimized.

To enable control of the rate of gas generation, a device according to the invention may comprise a variable resistor. In one embodiment, the device comprises a potentiometer plate which is held fixed in the collar and which is in electrical contact with a dry cell, whereby the dry cell is held fixed within the insert and is rotatable with the insert in order to vary the resistance of the potentiometer. In an alternative embodiment, the cylindrical portion of the collar houses the gas generation means and the insert holds a variable resistor that is turned in order to control the gas generation rate.

By these embodiments of the lubrication device according to the invention, a lubrication device is provided that is tamper-proof and that can be taken apart in a release position. In this way, the function of the lubrication device can be guaranteed during the life of the lubrication device, since the lubrication device is not adapted to be taken apart or to be serviced by a user, e.g. with the purpose of refilling the container and/or to replace the gas generating means. At the same time, it is possible to easily remove the part of the lubrication device, so as to gain access to the gas generation means, which requires separate disposal. Other advantages of the invention will become apparent from the following more detailed description and accompanying figures.

BRIEF DESCRIPTION OF THE DRAWINGS

The invention will be described in greater detail in the following, with reference to the embodiments that are shown in the attached drawings, in which.

DETAILED DESCRIPTION OF THE INVENTION

The embodiments of the invention with further developments described in the following are to be regarded only as examples and are in no way to limit the scope of the protection provided by the patent claims.

Figure 1:
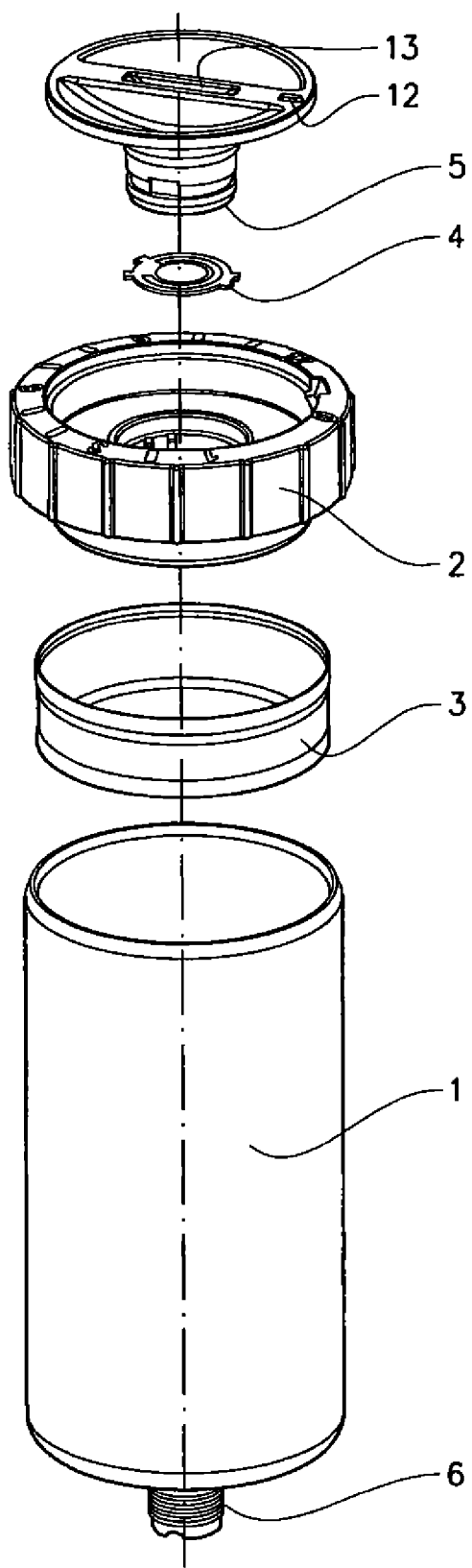
FIG. 1 shows a lubrication device according to the invention.
Figure 2B:
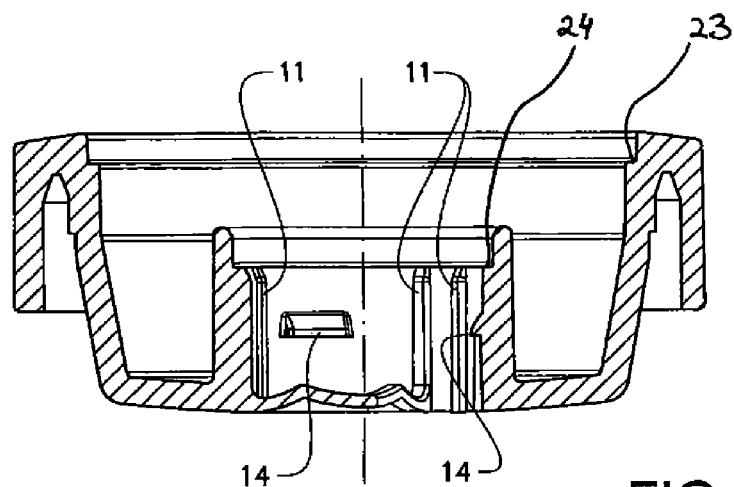
FIG. 2b shows a cross-sectional view of the collar.
Figure 2A:
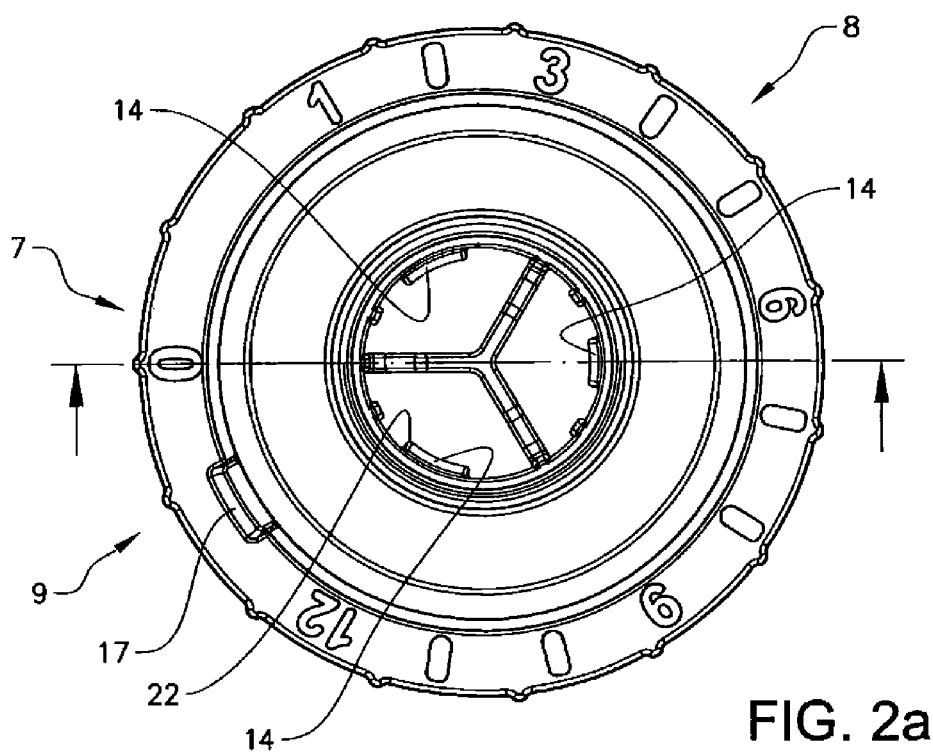
FIG. 2a shows a top view of a collar of the device.
Figure 3:
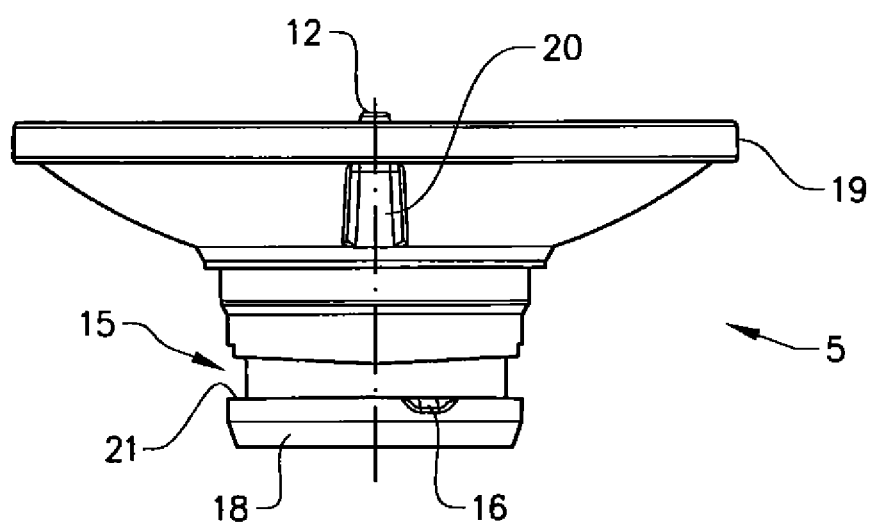
FIG. 3 shows a detail of an insert of the lubrication device according to the invention.

FIG. 1 shows an example of a lubrication device 10 according to the invention that is adapted to be screwed to a machine part to be lubricated. FIGS. 2a and 2b respectively show a top view and a cross-sectional view of a collar part 2 and FIG. 3 shows an insert 5 used in the device of FIG. 1. The lubrication device may be designed for either grease or oil lubrication. For the grease version, it suffices to provide the nozzle region with a properly designed outlet opening, whereas the oil version requires that the outlet opening is provided with an oil valve. FIG. 1 shows an example of a lubrication device that is adapted to dispense grease.

The lubrication device 10 comprises a container 1 in the form of a cylinder provided at a first end with a nozzle region 6 having an external thread. The device of this example further comprises a piston 3 that separates a grease reservoir from a gas pressure chamber above the piston. The piston 3 is pushed downwards towards the nozzle region when gas is generated, thereby supplying grease to the part to be lubricated. In some embodiments, the grease is held in the container 1 within a collapsible bag, in which case the piston 3 is optional.

At a second end of the container, the container 1 is covered by a collar 2 and a insert 5 received within the collar 2. In this example, the insert 5 is rotatable relative to the collar 2, and the collar is fixedly attached to an upper rim of the container 1. This may be done by using glue or, since both parts are made from plastic in the shown example, by spin welding. Other types of fixation means, such as a snap lock, would also be possible to use. The collar 2 comprises a first ledge 23 on which an upper rim 19 of the insert 5 rests, after it has been inserted into the collar.

In the device of FIG. 1, the insert 5 is adapted to house a gas generation cell, preferably a dry cell (not shown), which is held in engagement with the insert by means of e.g. longitudinal ribs on an inside cylindrical surface of the insert. In order to control the amount of gas generated, the gas cell is further held within a metal clip, part of which clip makes electrical contact with a potentiometer plate 4 that is seated within the collar 2. The potentiometer plate 4 is held in a fixed position by e.g. ridges 11 in the collar and is suitably provided with protrusions that correspond to the ridges. In this way, the potentiometer plate is held in a fixed position and the insert 5 and gas cell are rotated in order to vary the resistance of the electric circuit formed between the gas cell and the potentiometer plate 4, thereby varying the current and amount of gas generated. Further, a seal ring is provided between the insert 5 and the collar 2 in order to make the gas chamber gas-tight. Suitably, the collar 2 comprises a second ledge 24 on which the seal ring sits and seals against an engaging surface of the rotatable insert 5.

Figure 4:
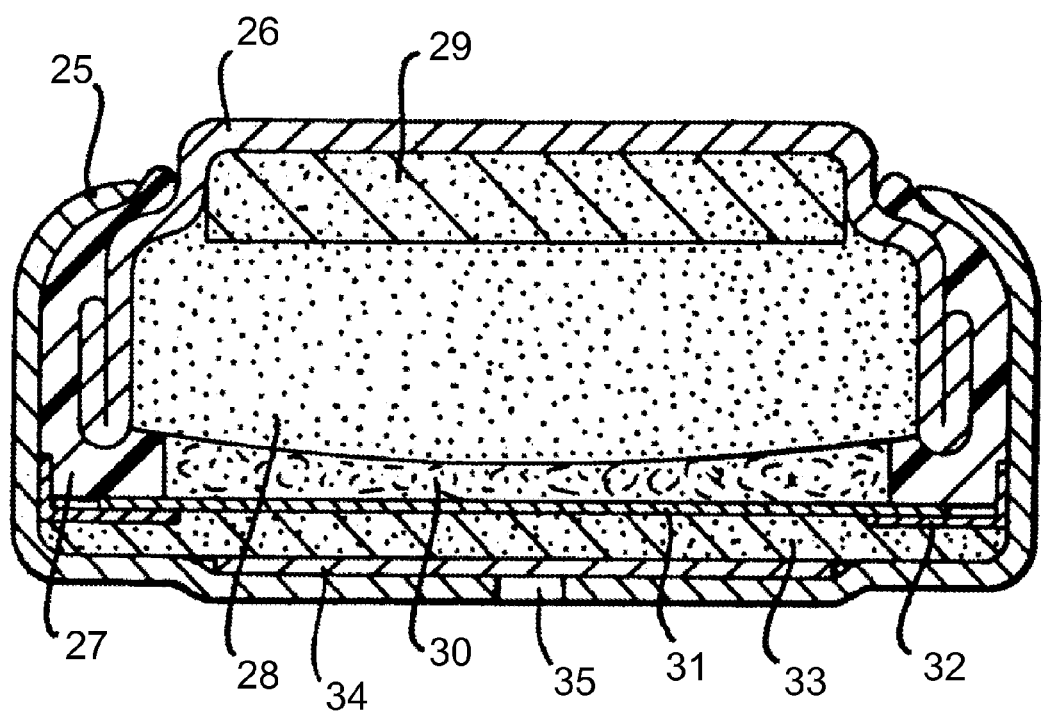
FIG. 4 shows a cross-sectional view of example gas generation cell.

FIG. 4 shows a cross-sectional view of an example of a gas generation cell as disclosed in U.S. Pat. No. 5,242,565. The gas generation cell includes a cup 25 and a cover 26 which together with a plastic seal 27 form the housing wall. Within the cover 26 and in contact with it, there is an active substance 28 in form of a zinc gel containing an electrolyte or in form of a porous tablet of a compound such as manganese dioxide. Compressible porous body 29 may contain an additional quantity of electrolyte. Element 30 is a fleece impregnated with electrolyte, and element 31 is a separator in the form of an ion-exchange foil. This foil is kept in position by a support ring 32. An example of a gas diffusion electrode 33 is made of a Raney-nickel powder bound with PTFE and rolled into a net of nickel. On the side to the bottom of the cup 25 the gas diffusion electrode 33 is provided with a foil of PTFE. Metallic support ring 32 is in contact with the gas diffusion electrode 33 and electrically connects the gas diffusion electrode 33 with cup 25. Element 34 is a wide-pore fleece layer which channels the gas generated in the gas diffusion electrode to opening 35 in the bottom of the cup from where it leaves the cell.

As shown best in FIG. 2*a*, a top surface of the collar 2 may be provided with a face dial 8 with e.g. numbers that indicate the release rate of lubricant from the lubrication device, corresponding to the amount of gas generated. The face dial 8 has one zero position 7 in which the lubrication device is turned off. In this position, there is no electrical connection of the gas cell, which means that no gas is generated. The device further comprises a release position 9 of the collar relative to the rotatable insert 5, in which it is possible to remove the insert 5 from the collar in a relatively easy way. According to the invention, a force required to remove the insert from the collar is lower in the release position than in non-release positions of the device. This will be explained in greater detail below.

The release position comprises a cut-out 17 in the top surface of the collar. The cut-out is adapted to receive e.g. a screw driver blade and is thus at least a few millimeters wide. In the depicted example, the depth of the cut-out is such that it reaches below the first ledge 23 on which the upper rim 19 of the insert 5 sits, thereby enabling a tool to be inserted underneath the rim 19 so that the insert can be prized off.

The insert 5 is suitably provided with an indicator 12 that shows the position of the rotatable insert relative to the face dial 8 on the collar 2. The insert 5 may further comprise a central slot 13 that is used to turn the insert to the desired position. The slot is adapted to receive a screwdriver, a coin or the like. The insert is further provided with a continuous groove 15 that extends around a base 18 of the insert. The groove 15 is provided with a contact surface 21 that is adapted to cooperate with catches 14 arranged in the collar 2. The contact surface 21 and the catches 14 cooperate as a snap lock such that when the insert is snapped into the collar, it cannot be removed without damaging the device. The contact surface 21 of the groove and the surfaces of the catches that bear on each other are both straight, i.e. perpendicular to the central axis of the lubrication device. In this way, the rotatable insert 5 will be held securely in place even when the pressure in the gas chamber rises above the working pressure. In one example of a 125 ml lubrication device, the working pressure is around 0.3-0.7 bar. In the release position, the groove and catches are designed to withstand a pressure of up to 2.5 bar, while in non-release positions, the groove and catches can withstand a pressure of up to 5 bar. It is therefore important that the surfaces of the groove and the catches can withstand an excessive pressure.

In order to facilitate the removing of the rotatable insert from the collar for separate disposal of the gas cell, the insert 5 is further provided with a small notch 16 in the contact surface 21 of the groove 15. The surface of the notch may be slightly angled. When the rotatable insert is turned to the release position 9 with the indicator 12 facing the cut-out 17 in the collar 2, the notch 16 will at the same time be positioned at a release edge 22 of one of the catches 14 in the shown example. If a suitable pry tool, a screw-driver or the like is inserted in the cut-out 17, the insert can be forced out of position relatively easily, since the base of the rotatable button will deform somewhat due to the force of the pry tool. This will allow the angled notch 16 to slide off the release edge of the catch instead of being caught by it. The notch 16 is provided in the contact surface 21 at a position where the notch will be aligned with the release edge 22 when the rotatable insert is in the release position. In this way, the force from the pry tool will allow the rotatable insert to be released. If a user tries to remove the insert 5 when the insert is not in the release position, a straight part of the contact surface 21 will bear on the release edge. The rotatable insert will thus only release at a substantially higher pry force.

The notch 16 may be positioned anywhere on the contact surface 21, but it is of advantage to position it in the region of the indicator 12, preferably within 90 degrees from the indicator position. The size of the notch 16 may also differ depending on the requirements. The width of the notch may, as in the shown example, be slightly narrower than the corresponding catch, or the width may be the same as the catch. When the notch has the same width as a catch, it is preferred to have one release catch that is narrower than the other catches. In this way, the notch will only correspond to the catch in the release position, and accidental release of the rotatable button is further prevented.

In order to further facilitate the release of the rotatable insert, and also to provide a release protection in which the pry tool can only be inserted into the cut-out 17 when the rotatable insert is in the release position, the upper rim of the insert 5 may be provided with a recess 20. A screwdriver or similar pry tool may then be inserted into the cut-out 17 and into the recess in the rim. This will allow the pry tool to exert a higher torque on the insert. When the rotatable insert 5 comprises such a recess, the cut-out 17 on the collar 2 need not extend below the rim 19 of the insert 5, meaning that it is only possible to prize off the insert 5 when the recess 20 is in alignment with the cut-out 17; i.e. in the release position 9.

Since the design pressure of the container is relatively high, and since the rotatable insert defines part of the pressure chamber of the lubrication device, the contact surface 21 of the insert 5 and the catches 14 of the collar must be able to withstand this pressure. The force required for removing the insert must thus be higher than this pressure. As the lubrication device is not intended to be used again, i.e. it should not be possible to replace the rotatable insert, the base 18 of the insert may be designed such that it breaks when it is removed. In this case, the notch may also constitute a weakening of the base that will cause at least part of the base to break off. Alternatively, at least one of the catches 14 on the collar 2 may be adapted to break off when the insert 5 is prized out.

When the rotatable insert is removed, the different parts of the lubrication device may be disposed of separately. Some parts may be recycled and some parts may be taken to a refuse incinerator for destruction. In this way, a lubrication device is provided that is tamper-proof, i.e. that is guaranteed to meet the specifications of the manufacturer, and that can be recycled in an easy way.

The invention is not to be regarded as being limited to the embodiments described above, a number of additional variants and modifications being possible within the scope of the subsequent patent claims.

REFERENCE NUMERALS

1: Container
2: Collar
3: Piston
4: Potentiometer plate
5: Rotatable insert
6: Nozzle region of container
7: Zero position
8: Dial on top surface of collar
9: Release position
10: Lubrication device
11: Ridge
12: Indicator on rotatable insert
13: Slot
14: Catch within the collar
15: Groove in rotatable insert
16: Notch in the groove
17: Cut-out in top surface of collar
18: Base of rotatable insert
19: Rim of rotatable insert
20: Recess
21: Contact surface of groove
22: Release edge of catch
23: First ledge on collar
24: Second ledge on collar

The invention claimed is:

1. A lubrication device for gas pressure-driven lubrication of a lubrication point, comprising:
   a lubricant container having an outlet opening at a first end and a combination of a collar and an insert received within the collar that covers a second end, wherein the collar and the insert are relatively rotatable; and
   a gas generation means housed within the combination,
   wherein the insert includes a groove having a contact surface forming a mechanical interlock with one or more catches of the collar when the insert is inserted into collar,
   wherein the lubrication device is provided with a release position of the insert relative to the collar,
   wherein a prying force required to disengage the mechanical interlock and separate the insert from the collar is less at the release position rather than at non-release positions, so that the insert can be removed to gain access to the gas generation means for separate disposal thereof,
   wherein the contact surface of the groove further comprises a notch, wherein in the release position, the notch is aligned with a catch of the collar, and
   wherein the collar comprises two or more catches, one catch being narrower than the other catches.

2. The device according to claim 1, wherein in the release position, the prying force required to disengage the mechanical interlock and separate the insert from the collar is between two and four times greater than a force exerted on the mechanical interlock at a maximum working pressure of the device; and in non-release positions, the prying force required to disengage the mechanical interlock and separate the insert from the collar is at least five times greater than a force exerted on the mechanical interlock at the maximum working pressure of the device.

3. The device according to claim 1, wherein in the release position the notch is aligned with a release edge of a catch of the collar.

4. The device according to claim 3, wherein the notch is angled such that the release edge can slide against the notch during the removal of the insert.

5. The device according to claim 1, further comprising a potentiometer for varying a current supplied to the gas generation means.

6. The device according to claim 5, wherein the potentiometer is fixedly positioned in the collar.

7. The device according to claim 5, wherein the potentiometer is fixedly positioned in the insert and the gas generation means is housed in the collar.

8. The device according to claim 1, wherein the insert is rotatable relative to the collar.

9. The device according to claim 8, wherein the gas generation means is housed within the insert and is rotatable therewith.

10. A lubrication device for gas pressure-driven lubrication of a lubrication point, comprising:
    a lubricant container having an outlet opening at a first end and a combination of a collar and an insert received within the collar that covers a second end, wherein the collar and the insert are relatively rotatable; and
    a gas generation means housed within the combination,
    wherein the insert includes a groove having a contact surface forming a mechanical interlock with one or more catches of the collar when the insert is inserted into collar,
    wherein the lubrication device is provided with a release position of the insert relative to the collar,
    wherein a prying force required to disengage the mechanical interlock and separate the insert from the collar is less at the release position rather than at non-release positions, so that the insert can be removed to gain access to the gas generation means for separate disposal thereof, and
    wherein the release position is reached by aligning an indicator on the insert with a cut-out of the collar, the cut-out being adapted to receive a removal tool for prying off the insert.

11. The device according to claim 10, wherein the contact surface of the groove further comprises a notch, and wherein in the release position, the notch is aligned with a catch of the collar.

12. The device according to claim 11, wherein the collar further comprises two or more catches, one catch being narrower than the other catches.

13. The device according to claim 12, wherein the notch has the same width as the narrow catch, wherein the narrow catch is in alignment with the notch when the device is in the release position.

14. The device according to claim 10, wherein the collar further comprises an upper ledge on which an upper rim of the insert rests, and the cut-out of the collar has a depth which extends below the upper ledge.

15. The device according to claim 10, wherein the depth of the cut-out is level with the upper ledge and the insert is provided with a recess in the upper rim, wherein the recess is in alignment with the cut-out in the release position of the device.

16. A lubrication device for gas pressure-driven lubrication of a lubrication point, comprising:
   a lubricant container having an outlet opening at a first end and a combination of a collar and an insert received within the collar that covers a second end, wherein the collar and the insert are relatively rotatable; and
   a gas generation means housed within the combination,
   wherein the insert includes a groove having a contact surface forming a mechanical interlock with one or more catches of the collar when the insert is inserted into collar,
   wherein the lubrication device is provided with a release position of the insert relative to the collar,
   wherein a prying force required to disengage the mechanical interlock and separate the insert from the collar is less at the release position rather than at non-release positions, so that the insert can be removed to gain access to the gas generation means for separate disposal thereof, and
   wherein at least one of the groove of the insert and a catch of the collar further comprises a weakening that is adapted to break off when the insert is removed from the collar.

17. A cover of a lubrication device for gas pressure-driven lubrication of a lubrication point, the cover comprising:
   a collar and an insert received within the collar, wherein the collar and the insert are relatively rotatable, and
   a gas generation means housed within the cover;
   wherein the insert is provided with a groove having a contact surface forming a mechanical interlock with one or more catches of the collar when the insert is in collar,
   wherein the cover is provided with a release position of the insert relative to the collar,
   wherein a prying force required to disengage the mechanical interlock and separate the insert from the collar is lower than at non-release positions, so that the insert can be removed to gain access to the gas generation means for separate disposal thereof,
   wherein the contact surface of the groove further comprises a notch, wherein in the release position, the notch is aligned with a catch of the collar, and
   wherein the collar comprises two or more catches, one catch being narrower than the other catches.

* * * * *